Feb. 14, 1939.    J. W. HORNER    2,147,344
MEASUREMENT OF BROKEN GRANULAR OR POWDERED MATERIALS
Filed Aug. 28, 1937    3 Sheets-Sheet 1

Fig. 1ª.

Inventor:-
John W. Horner
By his Attorney. Walter Gunn.

Feb. 14, 1939.    J. W. HORNER    2,147,344
MEASUREMENT OF BROKEN GRANULAR OR POWDERED MATERIALS
Filed Aug. 28, 1937    3 Sheets-Sheet 3

Inventor:-
John W. Horner
By his Attorney. Walter Gunn

Patented Feb. 14, 1939

2,147,344

UNITED STATES PATENT OFFICE 2,147,344

MEASUREMENT OF BROKEN GRANULAR OR POWDERED MATERIALS

John Wood Horner, Urmston, Manchester, England

Application August 28, 1937, Serial No. 161,482
In Great Britain September 14, 1936

5 Claims. (Cl. 73—194)

This invention relates to the measurement of materials such as coal, grain, cement or other broken granular or powdered materials, and more particularly to a means of the kind described and claimed in patent specification No. 1,498,298 wherein volumetric measurement is effected by measurement of the lineal movement of the material in a passage of known cross sectional area, using an endless flexible means in such passage to be embedded in and moved by the material and itself associated with movement-indicating mechanism.

Apparatus as described in the aforesaid patent specification has been in use for some years and has embodied a chain wheel having a chain inter-engaging formation, the rotation of the chain wheel operating the indicating instrument.

Chain wheels having grooves or recesses formed to receive and locate the individual links of the chain, such as are used, for example, on differential pulley blocks, have hitherto been generally employed. There has, however, been some difficulty in obtaining positive drive of the chain with certain classes of material without undue slip, unless the embedded length of chain were at least 6 to 8 feet. Such slip was anticipated by the suggested modification in Fig. 6 of said prior specification wherein are shown pallets or enlargements incorporated in the chain, but while in practice, these formations ensured the positive drive of the chain, it is found that they are not practicable as they interfere with the driving of the pulley.

By necessity, these formations must be tapered to avoid withdrawal of the material from the chute and such taper causes slip at the chain wheel by producing over-riding and like behaviour.

Consequently, the utility of the said known apparatus has been restricted to coal and certain kindred materials and the suggested modification of Fig. 6 of the prior specification has not been practicable to improve its accuracy or extend its utility to powders and like materials for the reasons above explained.

The object of this invention is to overcome the said difficulties.

According to the invention, the endless flexible member is always provided with pallets or other like enlargements to be engaged by the material in driving manner, and the indicating or counting mechanism is actuated by such pallets or enlargements, and not by the pulley.

In one example of the invention, the enlargements are substantially conical as shown in Fig. 6 of Patent No. 1,498,298 and the endless flexible member passes over an ordinary smooth-grooved pulley. Adjacent to the pulley is pivoted a trip lever, which at its free end is forked for the free passage of the chain part, but which is adapted to be engaged and moved by each enlargement as it (the enlargement) passes over the pulley, after which the lever falls back into a normal position. The lever is mounted on a shaft and carries a pawl, by which it is adapted to engage a ratchet wheel for step-by-step movement thereof. The ratchet wheel may be operably coupled to a revolution counter, suitably geared and calibrated to read in units of quantity, or it may be fixed on a shaft adapted to operate electrical make-and-break mechanism. For example, the shaft may carry two further ratchet wheels radially off-set and each engaged by a tumbler lever. These levers will carry suitable contact points and will move so that sometimes the points will be separated, while at others they will be in contact, with one lever supported off its ratchet wheel by the other. In this way a quick electrical make-and-break is obtainable. This make-and-break is inserted in the circuit of an impulse-operated mechanism coupled to the mechanical indicating or counting mechanism, so that such instruments may be located at any reasonable distance from the chute.

In the accompanying drawings:

Fig. 1A illustrates the lever and pawl separately and to a larger scale.

Figure 3:
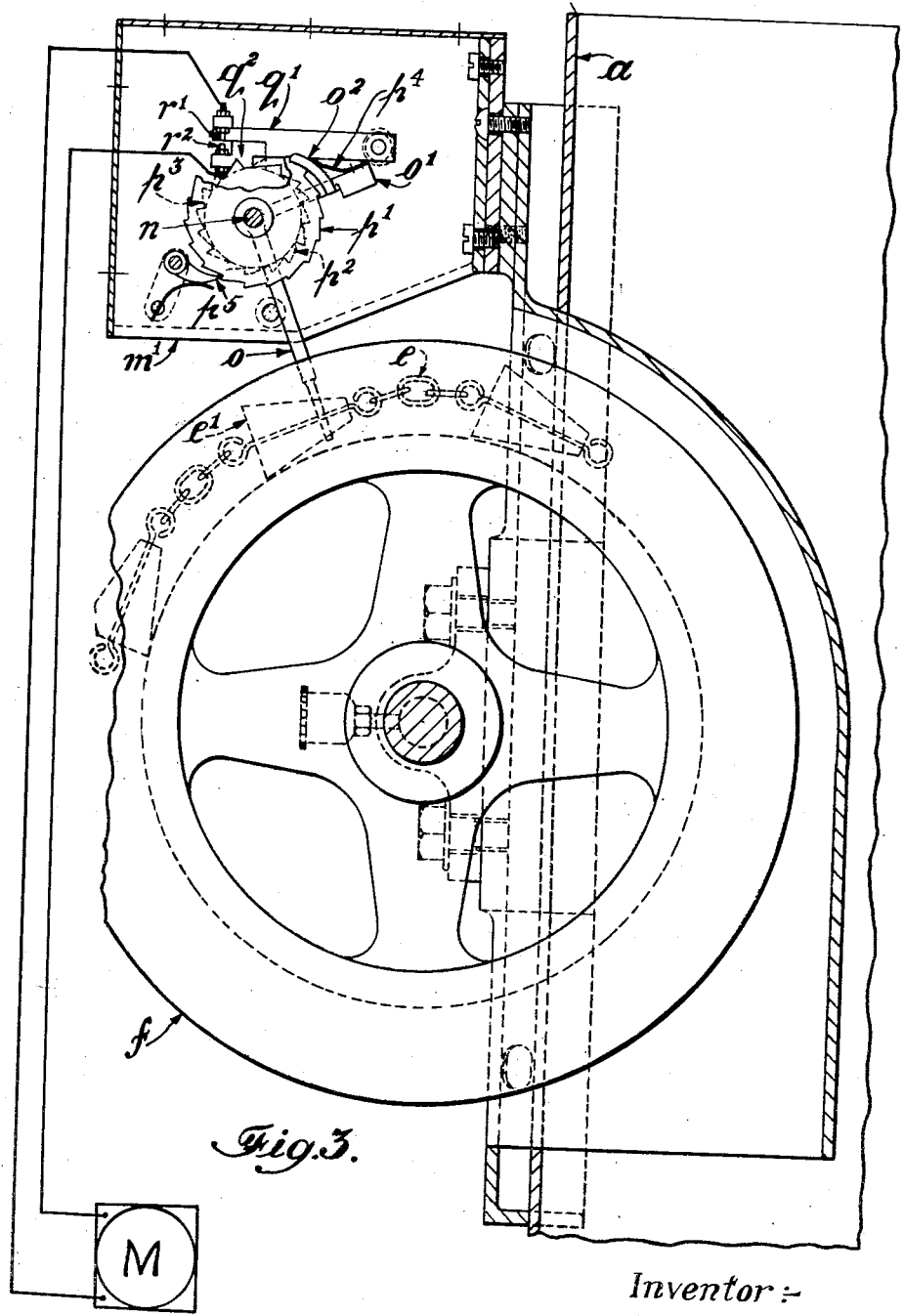

Fig. 3 a side sectional elevation of a similar apparatus but embodying the make-and-break devices for causing the indicating or counting mechanism to be operated electrically.

Figure 1:
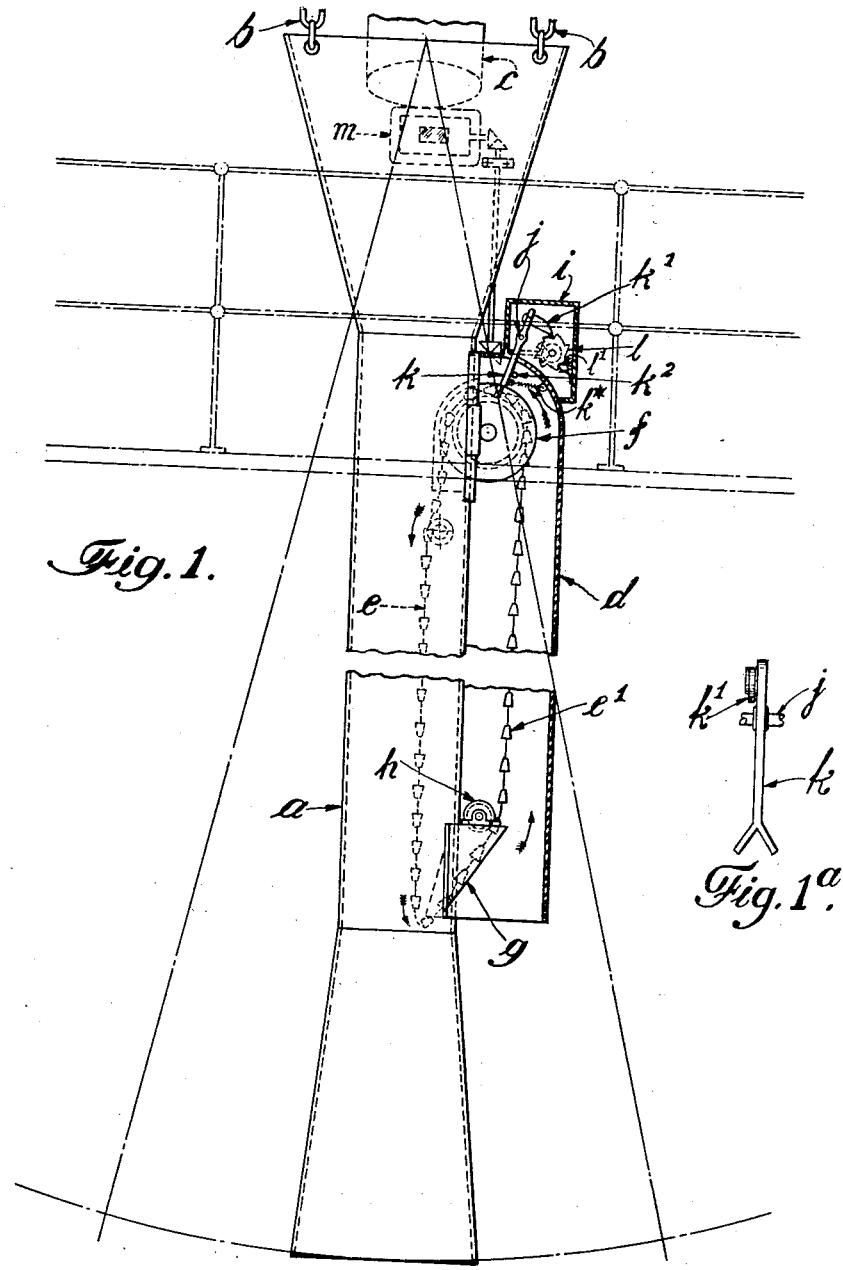
Fig. 1 illustrates a general front elevation of the complete measuring apparatus, as adapted for operating the indicating or counting mechanism mechanically.

As shown in Fig. 1, the chute comprises the usual metal tube $a$, adjustably supported by chains $b$, $b$ below the nozzle of the discharge pipe $c$. On one side of the chute is the housing $d$ enclosing the return length of the endless chain $e$, and at its upper end also enclosing the plain grooved pulley $f$.

The endless chain $e$ comprises the conical blocks or pallets $e^1$ spaced at short distances apart throughout the whole length of the chain. The smaller ends of the pallets point in the direction of movement of the chain, and are therefore the first to enter and leave the chute $a$.

A small supplementary housing g and guide pulley h are provided at the lower end of the housing d for guiding the chain and pallets as they leave the chute a.

Within the casing i fixed above the housing d is a spindle j to which is keyed the lever k. At its upper end the lever carries a pawl $k^1$ adapted to engage the teeth of a ratchet wheel l, the axis of which is operably coupled with the indicating or counting instrument m.

At its lower end the lever k extends into the groove of the pulley f, where it is shaped to span the links of the chain but lie in the path of the pallets $e^1$. As the chain travels over the pulley f, each pallet moves the lower end of the lever k forwardly, until by reason of its shape, it slips over the pallet and under its own weight or the pull of a light spring $k^*$ resumes its normal position. To limit such return movement of the lever a fixed stop $k^2$ is provided.

Under the successive impulses of the lever k by the chain pallets $e^1$, the lever k and pawl $k^1$ impart movement to the ratchet wheel l, and which, in turn, operates the indicating or counting instrument.

The indicating or counting instrument may be arranged in any suitable position relatively to the casing i. In the example shown in Fig. 1, it is arranged at a higher elevation than the casing and, the motion of the ratchet wheel l is transmitted to it through a spindle and bevel gears.

Figure 2:
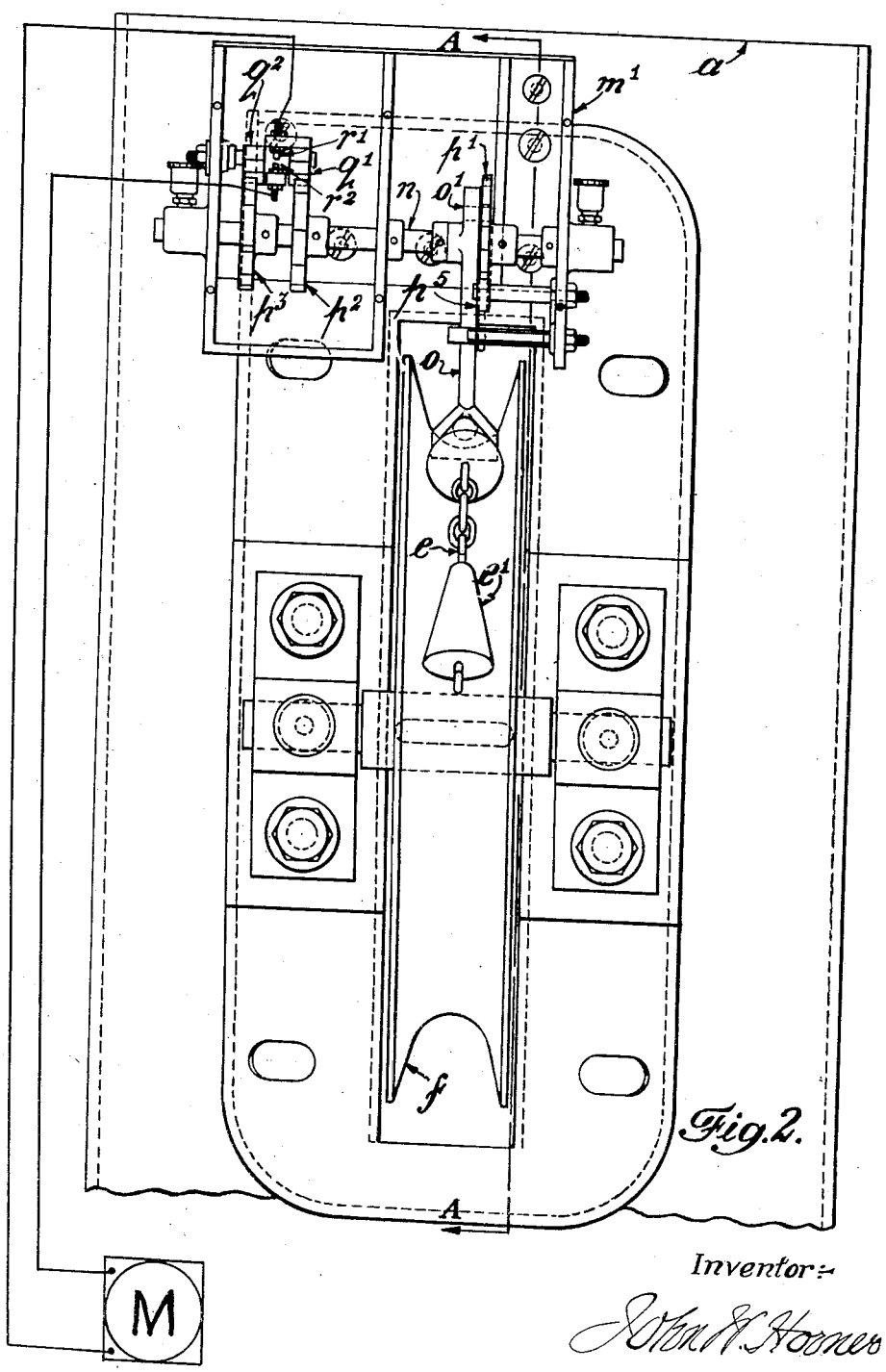
Fig. 2 illustrates, to a larger scale, a face view.

Referring now to Figs. 2 and 3, the mechanism for operating the indicating or counting instrument is situated in a casing $m^1$ and such mechanism consists of a spindle n, whereon is mounted a lever o and a series of three ratchet wheels $p^1$, $p^2$, $p^3$. Carried by an extension arm $o^1$ of the lever o is a pawl $o^2$ which engages the teeth of the ratchet wheel $p^1$ under the pressure of the spring $p^4$.

Above the level of the ratchet wheels $p^2$, $p^3$ are two lever arms $q^1$, $q^2$, which at their free ends have over-lying lateral parts carrying terminal contacts $r^1$, $r^2$, the contacts facing one another and both being in circuit with the impulse motor M of an electrically-operated measuring and indicating or counting instrument. Each of the lever arms $q^1$, $q^2$ rides on the ratchet wheel below it and therefore as the ratchet wheels rotate, they cause the lever arms $q^1$, $q^2$ to rise and fall alternately, and thereby make and break the electric circuits by which the indicating or counting instrument is actuated.

The teeth of the ratchet wheels $p^2$, $p^3$ are arranged in staggered relationship to each other so that as one wheel lowers its lever arm, the other wheel raises its lever arm and causes the terminal contacts $r^1$, $r^2$ to meet, whilst with the subsequent movement of the ratchet wheel $p^1$ both lever arms are raised until the lever arm $q^2$ is allowed to fall while the lever arm $q^1$ continues to rise.

In this example of the invention, it will be understood that the indicating or counting instrument may be at a distance remote from the chute.

As shown in Fig. 3, the ratchet wheel $p^1$ is provided with a spring-pressed retaining pawl $p^5$. The ratchet wheel l in Fig. 1 may also be provided with a retaining pawl $l^1$.

In all cases, the movements of the chain pallets and of the lever k or o, serve directly to transmit the motion of the chain e to the mechanism for operating the indicating or counting instrument, thereby rendering any slip between the chain and the pulley f negligible, as well as avoiding the need of pallet recesses in the pulley.

What I claim is:—

1. In combination, a chute for the passage of broken, granular or powdered materials, an endless flexible member, a portion of which lies in said chute, a plain smooth grooved pulley mounted adjacent the chute and over which said member passes, enlargements on said flexible member adapted for driving engagement by material passing through the chute and also adapted while passing over the said pulley to be displaced out of the normal lie of the flexible member in the groove of said pulley by engagement with the groove, a lever mounted adjacent to the pulley, said lever at one end entering the groove of the pulley and being shaped to span the flexible member but to lie in the path of the displaced enlargements on said flexible member, whereby the lever is actuated upon movement of the flexible member, involving passage of an enlargement over the pulley, resilient means operative to return said lever after the passage of each enlargement, an indicating mechanism and means for transmitting thereto the movements of the lever in one direction.

2. In combination, a chute for the passage of broken, granular or powdered materials, an endless flexible member, a portion of which lies in said chute, a plain smooth grooved pulley mounted adjacent the chute and over which said member passes, enlargements on said flexible member adapted for driving engagement by material passing through the chute and also adapted while passing over the said pulley to be displaced out of the normal lie of the flexible member in the groove of said pulley by engagement with the groove, a lever mounted adjacent to the pulley, said lever at one end entering the groove of the pulley and being shaped to span the flexible member but to lie in the path of the displaced enlargements on said flexible member, whereby the lever is actuated upon movement of the flexible member involving passage of an enlargement over the pulley, resilient means operative to return said lever after the passage of each enlargement, a pawl on the other end of said lever, a spindle a ratchet wheel mounted on said spindle and engaged and operated for rotation by said pawl upon movement of the lever, and indicating means connected to said ratchet wheel spindle.

3. Apparatus according to claim 2, wherein the endless flexible member is a chain and the enlargements thereon comprise conical shaped pallets.

4. In combination, a chute for the passage of broken, granular or powdered materials, an endless flexible member, a portion of which lies in said chute, a plain, smooth grooved pulley mounted adjacent the chute and over which said member passes, enlargements on said flexible member adapted for driving engagement by material passing through the chute and also adapted while passing over the said pulley to be displaced out of the normal lie of the flexible member in the groove of said pulley by engagement with the groove, a lever mounted adjacent to the pulley, said lever at one end entering the groove of the pulley and being adapted to span the flexible member but to lie in the path of the displaced enlargements on said flexible member whereby the lever is actuated upon movement of the latter involving passage of an enlargement over the pulley, resilient means operative to return said lever after the passage of each enlargement, a pawl on the other end of said lever, a spindle, a main ratchet wheel mounted on said spindle and engaged and operated for rotation by said pawl upon movement of the lever, two further ratchet wheels upon said spindle arranged with their teeth in staggered relationship, two pivoted lever arms engaging said two ratchet wheels and each at its free end carrying a terminal electrical contact, the two contacts facing each other and with the movements of the said two ratchet wheels, adapted to contact and complete an electric circuit and with further rotation of said wheels to break such circuit, and an impulse mechanism of an electrically actuated indicating instrument connected in said circuit.

5. In apparatus as claimed in claim 4, a spring for holding the pawl of the main ratchet wheel in engagement with such wheel and a spring pressed pawl to prevent reverse rotation of the ratchet wheels.

JOHN WOOD HORNER.